Figure 1:
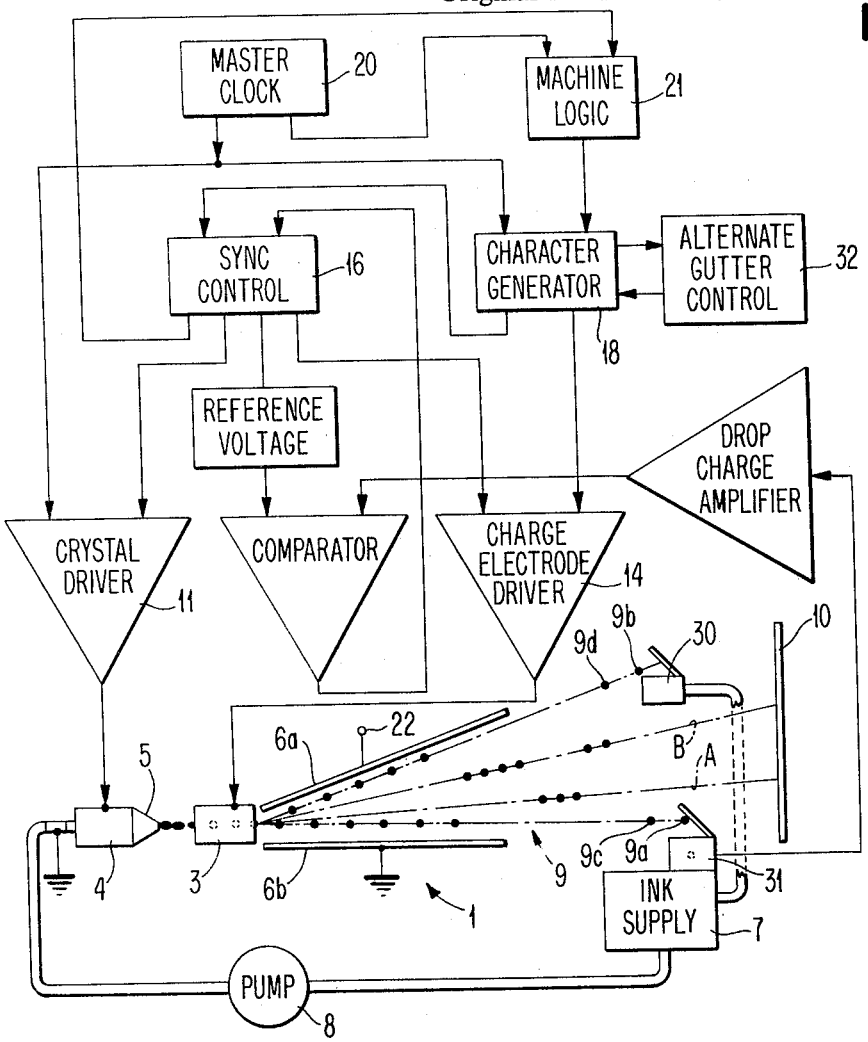
Figure 2A:
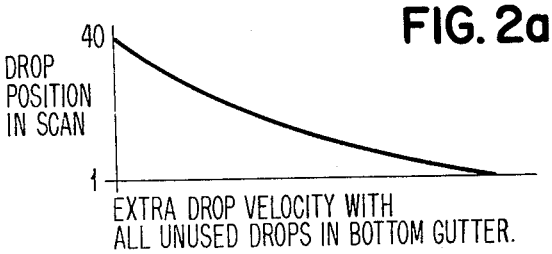
Figure 2B:
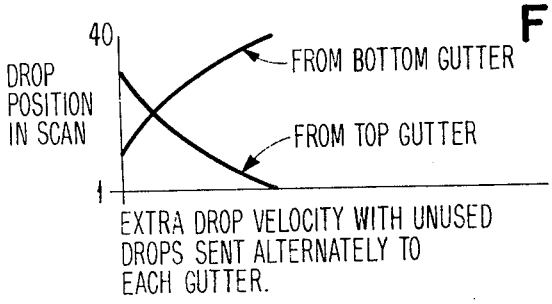
Figure 2C:
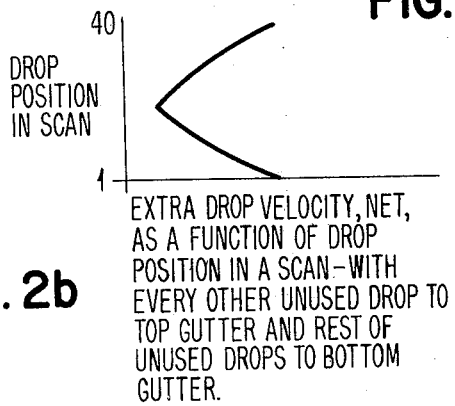

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 2, 1976

944 O.G. 42

T944,009

INK JET SYSTEM USING DUAL GUTTERS TO REDUCE AERODYNAMIC EFFECTS

Hugh E. Naylor III, Lexington, Ky., assignor to International Business Machines Corporation, Armonk, N.Y.

Filed Dec. 19, 1974, Ser. No. 534,403
**Int. Cl. G01d *15/18***
U.S. Cl. 346—75
1 Sheet Drawing. 4 Pages Specification

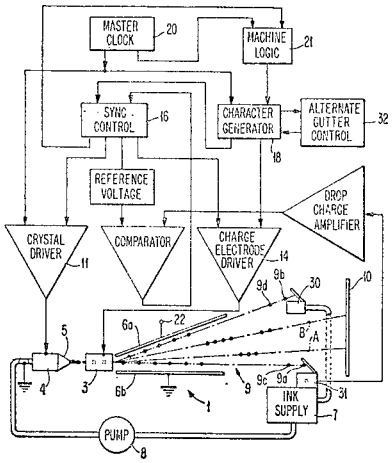

Ink drops not used for printing in an ink jet printer ordinarily comprise a large proportion of the drops generated and occur in a fairly continuous stream creating distortion due to wake effects. Such effects are minimized by directing the unused drops alternately to each of two gutters 30 or 31. Since there are only half as many drops in each of these streams, the wake is considerably reduced, perhaps by 50% "wake" in each stream. Nozzle assembly 1 includes crystal 4 vibrated by crystal driver 11 to form and propel drops from nozzle 5. Drops are variably charged by charge electrode 3 controlled by driver 14, sync control box 16 and character generator 18. Master clock 20 supplies clock pulses and block 21 controls the apparatus. Drops are deflected by potential across plates **6*a* and 6*b* from terminal 22. Drops not required for printing such as drops 9*a*, 9*c* and 9*b*, 9*d* are directed on an alternate basis to gutters 30 and 31 respectively under control of alternate gutter control block 32. Drops required for printing along lines A and B, for example, are directed along various paths to document 10. Drops landing in gutters 30, 31 are returned to ink supply 7 for recirculation by pump 8** through the system.

INK JET SYSTEM USING DUAL GUTTERS TO REDUCE AERODYNAMIC EFFECTS

Original Filed Dec. 19, 1974